United States Patent
Zheng et al.

(10) Patent No.: US 11,368,679 B2
(45) Date of Patent: Jun. 21, 2022

(54) ENCODING METHOD, DECODING METHOD, ENCODING APPARATUS, AND DECODING APPARATUS

(71) Applicant: SZ DJI TECHNOLOGY CO., LTD., Shenzhen (CN)

(72) Inventors: Xiaozhen Zheng, Shenzhen (CN); Weiran Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/187,794

(22) Filed: Feb. 27, 2021

(65) Prior Publication Data

US 2021/0185309 A1 Jun. 17, 2021

Related U.S. Application Data

(63) Continuation of application No. PCT/CN2018/103692, filed on Aug. 31, 2018.

(51) Int. Cl.
*H04N 19/105* (2014.01)
*H04N 19/159* (2014.01)

(52) U.S. Cl.
CPC ......... *H04N 19/105* (2014.11); *H04N 19/159* (2014.11)

(58) Field of Classification Search
CPC .... H04N 19/105; H04N 19/159; H04N 19/46; H04N 19/503; H04N 19/58
See application file for complete search history.

(56) References Cited

U.S. PATENT DOCUMENTS

| 9,369,711 B2 * | 6/2016 | Wang ............. H04N 19/46 |
| 2009/0232199 A1 | 9/2009 | Kobayashi et al. |

(Continued)

FOREIGN PATENT DOCUMENTS

| CN | 1767655 A | 5/2006 |
| CN | 1954602 A | 4/2007 |

(Continued)

OTHER PUBLICATIONS

The World Intellectual Property Organization (WIPO) International Search Report for PCT/CN2018/103692 dated Jun. 3, 2019 6 pages.

(Continued)

*Primary Examiner* — Francis Geroleo
(74) *Attorney, Agent, or Firm* — Anova Law Group, PLLC

(57) ABSTRACT

An encoding method includes encoding to-be-encoded images including one or more non-output images and a plurality of output images to generate a bitstream. A difference between picture order counts (POCs) of two neighboring output images having neighboring display orders is greater than 1. A ratio of a difference between POCs of two first output images of the plurality of output images to a photographing time interval of the two first output images is same as a ratio of a difference between POCs of two second output images of the plurality of output images to a photographing time interval of the two second output images. At least one of the two second output images is different from either of the two first output images. A POC of at least one of the one or more non-output images is between the POCs of the two neighboring output images.

18 Claims, 4 Drawing Sheets

100

Encode to-be-encoded images to generate a bitstream, the to-be-encoded images including non-output images and output images — S110

↓

Transmit the bitstream — S120

(56) References Cited

U.S. PATENT DOCUMENTS

| | | | |
|---|---|---|---|
| 2011/0199501 A1 | 8/2011 | Hayashi et al. | |
| 2013/0077687 A1* | 3/2013 | Wang | H04N 19/174 |
| | | | 375/240.15 |
| 2015/0373377 A1 | 12/2015 | Wang et al. | |
| 2017/0201751 A1* | 7/2017 | Seo | H04N 19/172 |

FOREIGN PATENT DOCUMENTS

| | | |
|---|---|---|
| CN | 101300851 A | 11/2008 |
| CN | 104067618 A | 9/2014 |
| CN | 104937942 A | 9/2015 |
| CN | 105163117 A | 12/2015 |
| CN | 105208390 A | 12/2015 |
| CN | 108243339 A | 7/2018 |
| WO | 2014106388 A1 | 7/2014 |
| WO | 2016026526 A1 | 2/2016 |

OTHER PUBLICATIONS

Li (DJ W et al.: "CE11: HEVC-like encoder only solution for composite reference picture", 11. JVET Meeting; No. JVET-K0157, Jul. 17, 2018.
"Text of CD ISO/IEC 23008-2:201x High Efficiency Video Coding (4th ed.)", 120. MPEG Meeting; No. n17205, Jan. 17, 2018.
Xiaozhen Zheng et al. "CE11: Summary report on composite reference pictures." Jul. 10-18, 2018, 11th Joint Video Experts Team (JVET), 11th Meeting, Ljublijana, SI.

* cited by examiner

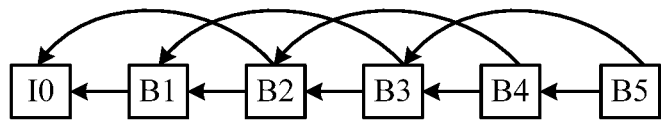
FIG. 4
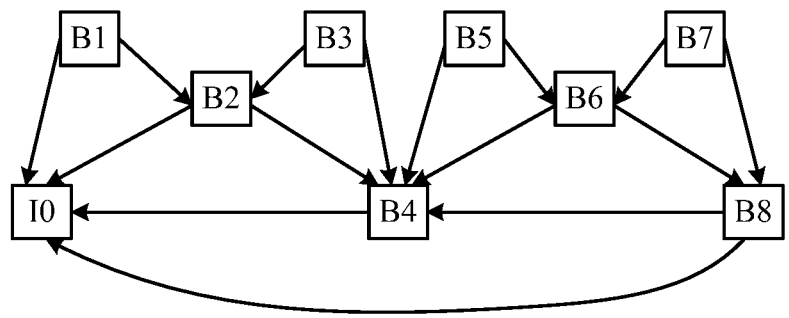
FIG. 5
200
| Receive the bitstream, the bitstream including to-be-decoded data of the non-output images and the output images | S210 |
| --- | --- |
| Decode the bitstream | S220 |
FIG. 6

ENCODING METHOD, DECODING METHOD, ENCODING APPARATUS, AND DECODING APPARATUS

CROSS-REFERENCE TO RELATED APPLICATION

This application is a continuation of International Application No. PCT/CN2018/103692, filed Aug. 31, 2018, the entire content of which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure generally relates to the video encoding and decoding field and, more particularly, to an encoding method, a decoding method, an encoding apparatus, and a decoding apparatus.

BACKGROUND

In some existing video encoding and decoding technologies, an encoding apparatus performs encoding on some specific images and transmits these images in a bitstream. These specific images are decoded by a decoding apparatus and used as reference images or other references, which are not output by the decoding apparatus. In the specification, these specific images are referred to as non-output images.

In the existing video encoding and decoding technologies, in general, the non-output images are not encoded in the bitstream but are constructed at the encoding apparatus and the decoding apparatus. Constructing the non-output images in the decoding apparatus will cause the processing of the decoding apparatus to be complex. Therefore, in some other video encoding and decoding technologies, when the encoding apparatus performs encoding, the non-output images are inserted among the output images, and then, all the images are continuously encoded by picture order counts (POCs). However, inserting the non-output images randomly will damage the time correlation of the POCs of the output images, which will cause problems such as motion vector prediction errors and scaling failures during encoding or decoding.

SUMMARY

In accordance with the disclosure, there is provided an encoding method including encoding to-be-encoded images including one or more non-output images and a plurality of output images to generate a bitstream. A difference between picture order counts (POCs) of two neighboring output images having neighboring display orders is greater than 1. A ratio of a difference between POCs of two first output images of the plurality of output images to a photographing time interval of the two first output images is same as a ratio of a difference between POCs of two second output images of the plurality of output images to a photographing time interval of the two second output images. At least one of the two second output images is different from either of the two first output images. A POC of at least one of the one or more non-output images is between the POCs of the two neighboring output images.

Also in accordance with the disclosure, there is provided a decoding method including receiving a bitstream including to-be-decoded data of one or more non-output images and a plurality of output images and decoding the bitstream. A difference between picture order counts (POCs) of two neighboring output images having neighboring display orders is greater than 1. A ratio of a difference between POCs of two first output images of the plurality of output images to a photographing time interval of the two first output images is same as a ratio of a difference between POCs of two second output images of the plurality of output images to a photographing time interval of the two second output images. At least one of the two second output images is different from either of the two first output images. A POC of at least one of the one or more non-output images is between the POCs of the two neighboring output images.

Also in accordance with the disclosure, there is provided a decoding apparatus including a processor and a memory storing computer instructions that, when executed by the processor, cause the processor to receive a bitstream including to-be-decoded data of one or more non-output images and a plurality of output images and decode the bitstream. A difference between picture order counts (POCs) of two neighboring output images having neighboring display orders is greater than 1. A ratio of a difference between POCs of two first output images of the plurality of output images to a photographing time interval of the two first output images is same as a ratio of a difference between POCs of two second output images of the plurality of output images to a photographing time interval of the two second output images. At least one of the two second output images is different from either of the two first output images. A POC of at least one of the one or more non-output images is between the POCs of the two neighboring output images.

BRIEF DESCRIPTION OF THE DRAWINGS

FIG. 4 is a schematic diagram showing a reference relationship among images of a GOP according to another embodiment of the present disclosure.

FIG. 5 is a schematic diagram showing a reference relationship among images of a GOP according to another embodiment of the present disclosure.

FIG. 6 is a schematic flowchart of a decoding method according to an embodiment of the present disclosure.

DETAILED DESCRIPTION OF THE EMBODIMENTS

Figure 1:
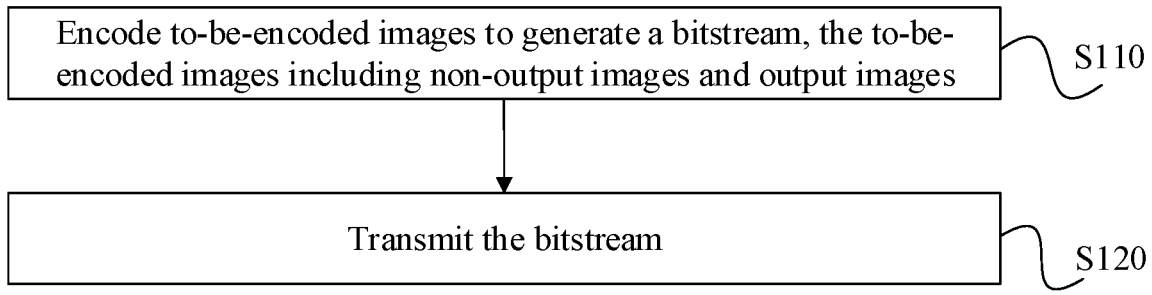
FIG. 1 is a schematic flowchart of an encoding method according to an embodiment of the present disclosure.

In connection with the accompanying drawings, the technical solutions of embodiments of the present disclosure are described below.

Unless otherwise defined, all technical and scientific terms used herein have the same meaning as commonly understood by those skilled in the art of this application. The terms used in the specification of the present disclosure herein are only for the purpose of describing specific embodiments and are not intended to limit the application.

First, related technology and concepts involved in embodiments of the present disclosure are introduced.

In recent years, because portable devices, handheld devices, and wearable devices have become more and more popular, a content volume of a video continues to grow. As the video format becomes more and more complex, storage and transmission of the video become more and more challenging. To reduce bandwidth occupied by the storage and the transmission of the video, video data is usually encoded and compressed at an encoding end and decoded at a decoding end.

An encoding compression process may include prediction, transformation, quantization, and entropy coding. Among them, the prediction may include two types: intra prediction and inter prediction, which are intended to use prediction block data to remove redundant information of a current to-be-encoded image block. The intra prediction may use information of a current image to obtain the prediction block data. The inter prediction may use reference image information to obtain the prediction block data. A process of the inter prediction may include dividing the current to-be-encoded image into a plurality of to-be-encoded image blocks and then dividing the to-be-encoded image blocks at least once (for example, using the quadtree partition method in the high-efficiency video coding (HEVC) standard or the quadtree binary tree partition method) into several image blocks. Then, for each sub image block, the image block that best matches the current sub image block may be searched for in the reference image to be used as a prediction image block. A relative displacement between the prediction image block and the current sub image block is a motion vector. Thereafter, a residual may be obtained by subtracting corresponding pixel values of the prediction image block from the corresponding pixel values of the sub image block. Obtained residuals corresponding to the sub image blocks may be combined to obtain the residual of the to-be-encoded image block. An entropy coded bitstream may be obtained after transformation, quantization, and entropy coding are performed on the residual. The entropy-coded bitstream and encoded coding mode information, such as intra prediction mode, motion vector (or motion vector residual), etc., may be saved or transmitted to the decoding end.

At the image decoding end, after the entropy-coded bitstream is obtained, entropy decoding may be performed to obtain a corresponding residual. According to information, such as the motion vector, intra prediction, etc., obtained by decoding, the prediction image block corresponding to a to-be-decoded image block may be searched. According to the prediction image block and the residual, pixel values in the image block may be obtained by decoding.

It can be seen from the above description that when inter prediction is performed, the more similar the selected reference image and the current to-be-encoded image is, the smaller the residual generated by the inter prediction is, such that the encoding efficiency of the inter prediction may be improved. Specifically, in some existing technologies, the images in the video may be used to construct a high-quality long-term reference image containing a background content of a scene. When the inter prediction is performed, the background part of the current to-be-encoded image or the current to-be-decoded image may be used to reduce the residual information of the inter prediction by referring to the high-quality long-term reference image to improve the encoding efficiency. That is, the long-term reference image may be used as a reference image for the inter prediction. In an embodiment, the long-term reference image may be an encoded/decoded image, for example, an encoded/decoded I frame. In an embodiment, the long-term reference image may be a constructed image. The long-term reference image may include a plurality of image blocks. Any one of the image blocks is taken from a certain encoded/decoded image. Different image blocks in the long-term reference image may be taken from different encoded/decoded images.

A video may include a plurality of images. As described above, when encoding/decoding is performed on the video, different prediction methods can be applied to different images in the video. According to the prediction methods used by the images, the images may be divided into intra prediction images and inter prediction images. The inter prediction images may include a forward prediction image and a bidirectional prediction image. I image is an intra prediction image, also referred to as a keyframe. P image is a forward prediction image, that is, a P image or an I image that has been previously encoded/decoded is used as a reference image. B image is a bidirectional prediction image, that is, images before and after are used as reference images.

In an embodiment, the encoding/decoding end may encode/decode a plurality of images to generate groups of pictures (GOPs). In an embodiment, a GOP may include one I image, and a plurality of B images (bidirectional prediction images) and/or P images (forward prediction images). In another embodiment, a GOP may include a single intra prediction image or a plurality of inter prediction images. For example, a GOP may include a plurality of B images and/or P images. When the video is being played at the decoding end, the video is read GOP by GOP for decoding, and then the images may be read and then be rendered.

In a modern video encoding/decoding standard, images of different resolutions may be encoded/decoded by dividing the images into a plurality of small blocks, that is, an image may be divided into a plurality of image blocks. The image may be divided into any number of image blocks. For example, the image may be divided into an image block array of m×n. The image block may have a rectangular shape, a square shape, a circular shape, or any other shape. The image block may have any size, e.g., p×q pixels. Each image block may have a same size and/or shape. Alternatively, two or more image blocks may have different sizes and/or shapes. The image blocks may or may not have any overlapping parts. In some embodiments, the image block may be referred to as a macroblock or a largest coding unit (LCU) in some encoding/decoding standards. For the H.264 standard, the image block is referred to as the macroblock, and its size may be 16×16 pixels. For the HEVC standard, the image block is referred to as a coding tree unit (CTU), and its size may be from 8×8 pixels to 64×64 pixels.

In some other embodiments, an image block may not be a macroblock or a CTU, but may include a part of a macroblock or a CTU, or include at least two complete macroblocks (or CTUs), or include at least one complete macroblock (or CTU) and a part of a macroblock (or a CTU), or include at least two complete macroblocks (or CTUs) and some parts of a macroblock (or CTU). As such, after the image is divided into the plurality of image blocks, the image blocks of the image data may be encoded/decoded.

In some other embodiments, an image block may refer to a part of a macroblock or a CTU. For example, an image block may refer to a coding unit (CU) in some video encoding/decoding standards.

The above long-term reference image may be a specific example of a non-output image. In some implementations, the non-output image may have at least one of the following properties: a constructed frame, a long-term reference image, a short-term reference image, or a constructed long-term reference image. In some implementations, the constructed frame may be also referred to as a composite reference. In some other implementations, the non-output image may include an image other than the constructed frame, or include an image other than the long-term reference image, or include an image other than the constructed long-term reference image. The non-output image may refer to an image that is not output for displaying. Generally speaking, the non-output image may exist as a reference image for another image.

In some embodiments, when the image in the video is used as the reference image, the long-term reference image and the short-term reference image may be distinguished from each other. The short-term reference image may be a concept relative to the long-term reference image. The short-term reference image may exist in the reference image buffer for a period of time. After several operations of moving the decoded reference image after the short-term reference image into or out of the reference image buffer, the short-term reference image may be moved out of the reference image buffer. The reference image buffer may also be referred to as a reference image list buffer, a reference image list, a reference frame list buffer, or a reference frame list, etc., which is collectively referred to as the reference image buffer in this specification.

The long-term reference image (or part of the data in the long-term reference image) may always exist in the reference image buffer. The long-term reference image (or the part of the data in the long-term reference image) may not be affected by the moving of the decoded reference image into and out of the reference image buffer. The long-term reference image (or the part of the data in the long-term reference image) will be moved out of the reference image buffer only when the decoding end transmits an update instruction operation.

The short-term reference image and the long-term reference image may be named differently in different standards. For example, in H.264/advanced video coding (AVC) or H.265/HEVC standards, the short-term reference image is referred to as a short-term reference, and the long-term reference image is referred to as a long-term reference. As another example, in the audio-video coding standard (AVS) 1-P2, AVS2-P2, institute of electrical and electronics engineers (IEEE) 1857.9-P4, etc., the long-term reference image is referred to as a background picture. As another example, in standards like VP8 and VP9, the long-term reference image is referred to as a golden frame.

It should be understood that specific terms used in embodiments of the present disclosure do not mean that the terms must be applied in a specific scenario. For example, referring to a long-term reference image as a long-term reference does not mean that the technologies corresponding to the standards of H.264/AVC or H.265/HEVC must be used.

The long-term reference image mentioned above may be obtained by constructing image blocks taken from a plurality of encoded/decoded images or obtained by updating the existing reference frames (for example, pre-stored reference frames) by using the plurality of encoded/decoded images. In one possible construction manner, after an image (I image) of a random access point is encoded, the constructed frame may be initialized to an image of the random access point. When any image before a next random access point is being encoded, the current image may be used to compare with a previous image block by block. When an image block of the current image is similar to the image block at a corresponding position of the previous image, the image block may be considered as a part of the background, and the corresponding position of the constructed frame is replaced with this image block. When the amount of replaced blocks in the constructed frame reaches a certain proportion, the construction of the constructed frame may be considered to be completed. The constructed frame may be used as the long-term reference image. Of course, in some other embodiments of the present disclosure, the long-term reference image may be not a constructed reference image.

Optionally, a type of an image may be identified by a special field in the bitstream structure.

Optionally, when an image is determined as a long-term reference image, the image may be determined as a non-output image, or when the image is determined as a constructed frame, the image may be determined as the non-output image.

Optionally, both non-output image and output image may have corresponding identifications. In this case, for the decoding end, whether an image is a non-output image or an output image may be determined according to the identification of the image.

In some embodiments, when an image is determined to have an identification of a long-term reference image, the image may be determined as a non-output image.

In some embodiments, when an image is determined to have a non-output identification, the image may be determined as a non-output image.

In some embodiments, when an image is determined to have an identification of a constructed frame, the image may be determined as a non-output image.

Optionally, the above identifications may be included in a sequence header, a picture header, a picture parameter set (PPS), or a slice header for determining whether the image is a non-output image.

In embodiments of the present disclosure, an image may be divided into at least one slice. Each slice may include a group of coding units. Each slice may be encoded, decoded, or reconstructed independently. Information such as the reference image used in encoding/decoding may be encoded at the slice header.

In an encoding/decoding apparatus, to distinguish or index each encoded/decoded image, each image may be numbered. For example, in the current HEVC standard, the images may be numbered according to display orders. When a reference image is indexed or an image distance is calculated, the number of the display order may be used for calculation.

In the HEVC standard, the reference images may be managed by using a concept called reference pictures set (RPS). A reference image used for encoding may be identified by an RPS configuration parameter. The reference image may include a short-term reference image and/or a long-term reference image. By indicating the RPS configuration parameter with RPS information, it is possible to know which images need to be used as reference images for encoding/decoding the current image. In some embodiments, it is possible to know which images in the reference image buffer are no longer used for reference. For different slices, there may be different RPS configuration parameters to flexibly select the reference images. The RPS information may be encoded at the beginning of each slice, that is, in the slice header. The RPS information may also be encoded in the sequence header, image header, or PPS. It should be understood that the image header may include the parameters of the entire image. To simplify the encoding of the image header, the subsequent image may be identified by the index in the PPS if the image header does not change much. If the image is divided into slices, the RPS information is usually not located in the image header, but in the slice header.

For example, the reference image information that needs to be marked by the RPS configuration parameters of the short-term reference image may include: how many short-term reference images the current image has, how large is an offset of a picture order count (POC) of each short-term reference image relative to the current image, which short-term reference images of all the short-term reference images are available for the current image, etc. The RPS configuration parameters of a short-term reference image of a typical lowdelay-B encoding is shown in Table 1.

indicates which method is used to encode the RPS configuration parameters. In the RPS configuration parameters of index 1, "predict" is 0, which means that the RPS configuration parameters of index 1 use the direct encoding. In RPS configuration parameters of index 2-4, "predict" is 1, which means that the RPS configuration parameters of index 2-4 use the prediction encoding. The prediction encoding method may be as follows: "deltaRPS" represents an offset of the RPS configuration parameters from the reference RPS configuration parameters in "reference_pictures." For example, if a value of "deltaRPS" is −1, the POCs of "reference_pictures" may be added by −1 to obtain "reference_pictures" of the RPS configuration parameters during prediction. "ref ides" indicates how many POCs of "reference_pictures" need to be used for reference, and corresponding specific images are listed in "reference ides." For example, here "reference ides" of the RPS configuration parameter of index 2 is 1 1 1 0 1, which means that first, second, third, and fifth values of the "reference_pictures" of the RPS configuration parameters (the RPS configuration parameters of index 1) need to be used as references (the POC of "reference_pictures" that does not exist in the RPS configuration parameters of index 1, for example, the fifth "reference_pictures," is considered to be 0). Therefore, the RPS configuration parameters of index 2 may use −1, −5, −9, and 0 relative to the RPS configuration parameters of index 1 as a reference. After "deltaRPS" is added, values of −2, −6, −10, −1 are obtained for four "reference_pictures," which are sorted to obtain −1, −2, −6, −10, that is, "reference_pictures" of the RPS configuration parameter of index 2 in Table 1. Similarly, "reference ides" of the RPS configuration parameter of index 3 is 0 1 1 1 1. "deltaRPS" is added to "reference_pictures"-2, −6, −10, 0 corresponding to the RPS configuration parameter of index 2 to obtain −3, −7, −11, −1, which are sorted to obtain values of −1, −3, −7, −11 as "reference_pictures" of the RPS configuration parameter of

TABLE 1

RPS configuration parameters of a short-term reference image of lowdelay B encoding

| index | type | POC | ref_pics_active | ref_pics | reference_pictures | predict | deltaRPS | ref_idcs | reference idcs |
|---|---|---|---|---|---|---|---|---|---|
| 1 | B | 1 | 4 | 4 | −1 −5 −9 −13 | 0 | | | |
| 2 | B | 2 | 4 | 4 | −1 −2 −6 −10 | 1 | −1 | 5 | 1 1 1 0 1 |
| 3 | B | 3 | 4 | 4 | −1 −3 −7 −11 | 1 | −1 | 5 | 0 1 1 1 1 |
| 4 | B | 4 | 4 | 4 | −1 −4 −8 −12 | 1 | −1 | 5 | 01 1 1 1 |

In the table, "index" denotes an index of the RPS configuration parameters of the short-term reference image. "type" denotes an encoding method, and "B" indicates that a bidirectional prediction encoding method is used. "POC" denotes a position of the image, to which the RPS configuration parameter applies, in the GOP. "ref_pics_active" indicates a total number of available short-term reference images to which the RPS configuration parameters are applicable. "ref_pics" indicates a number of short-term reference images in the reference image buffer. "reference_pictures" indicates the offset of POCs of the short-term reference images in the reference image buffer relative to the current image. When the RPS configuration parameters are encoded, two methods may be used—direct encoding and prediction encoding. Direct encoding is to write all the elements that need to be encoded directly into the bitstream. Prediction encoding is to use the encoded RPS configuration parameters to simplify encoding elements. For example, "predict" of the RPS configuration parameters in Table 1 index 3. The RPS configuration parameters of index 4 are similar and not repeated here.

Table 1 is only an exemplary description of the RPS configuration parameters of the short-term reference images using the existing POC configuration method. It should be understood that the RPS configuration of the short-term reference images may have other forms, and is not limited to the format and content of the above table. The RPS configuration of the short-term reference image and the RPS configuration of the long-term reference image in the present disclosure application will continue to be described in detail below.

FIG. 1 is a schematic flowchart of an encoding method 100 according to an embodiment of the present disclosure. As shown in FIG. 1, the encoding method 100 includes the following processes.

At S110, to-be-encoded images are encoded to generate a bitstream. The to-be-encoded images include non-output images and output images. A difference between POCs of any two output images having neighboring display orders is greater than 1. Two output images having neighboring display orders means that in a display sequence, one of the two output image is displayed immediately after the other one of the two output image. The two output images having neighboring display orders are also referred to as "neighboring output images." A ratio of a difference between POCs of any two output images to a photographing time interval of the any two output images is same (i.e., does not change throughout the output images). That is, a ratio of a difference between POCs of two first output images to a photographing time interval of the two first output images is the same as a ratio of a difference between POCs of two second output images to a photographing time interval of the two second output images. The two first output images can be any two of the output images, and the two second output images can be any two of the output images with at least one of the two second output images being different from either of the two first output images. The photographing time interval of two images refers to a time interval between a time point at which one of the two images is photographed and a time point at which the other one of the two images is photographed. A POC of at least one non-output image is between the POCs of the two output images having neighboring display orders.

At S120, the bitstream is transmitted.

In the encoding method of embodiments of the present disclosure, the non-output image may be encoded into the bitstream. A difference of POCs of any two output images having neighboring display orders may be greater than 1, a ratio of a difference between POCs of any two output images to a photographing time interval of the any two output images may be same. Moreover, a POC of a non-output image may exist between POCs of two output images having neighboring display orders. As such, the non-output image may be inserted among the output images without affecting the time correlation of the POCs of the output images, which may avoid the problems such as motion vector prediction errors and scaling failures during encoding.

In embodiments of the present disclosure, the ratio of the difference between the POCs of the any two output images to the photographing time interval of the any two output images being the same means that the ratio of the difference between the POCs of the any two output images to the photographing time interval of the any two output images is proportional. In other words, a ratio of a difference between POCs of any two output images to a photographing time interval of the any two output images is equal to a ratio of a difference between POCs of any other two output images to a photographing time interval of the any other two output images.

"The ratio of the difference between the POCs of the any two output images to the photographing time interval of the any two output images being proportional" is described in detail below. For two of the output images, e.g., output image A and output image B, assume that a POC of output image A is $POC_A$ and photographing time is $t_A$; assume that a POC of output image B is $POC_B$ and photographing time is $t_B$. A difference between the POCs of output image A and output image B is $POC_B-POC_A$. A photographing time interval between output image A and output image B is $t_B-t_A$. For two of the output images, such as output image C and output image D, assume that a POC of output image C is $POC_C$ and photographing time is $t_C$; assume that a POC of output image D is $POC_D$ and photographing time is $t_D$. A difference between the POCs of the output image C and the output image D is $POC_D-POC_C$. A photographing time interval of the output image C and the output image D is $t_D-t_C$. The ratio of the difference between the POCs of the any two output images to the photographing time interval of the any two output images being proportional means that the ratio of $POC_B-POC_A$ to $t_B-t_A$ is equal to the ratio of $POC_D-POC_C$ to $t_D-t_C$. At most one of output image C and output image D may be the same as output image A or output image B.

It should be understood that, in embodiments of the present disclosure, by ensuring a ratio of a difference between POCs of any two output images to a photographing time interval of the any two output images to be proportional, it can be ensured that the POCs of a plurality of output images may reflect a time characteristic of photographing times. As such, the motion vector predicted based on the POCs or the scaling operation based on the POCs may be ensured to be correct.

In some embodiments, in the output images, at least for some pairs of two output images having neighboring display orders, the difference between the POCs thereof may be the same.

Optionally, in some embodiments of the present disclosure, the picture order count, that is, the POC, may be determined by multiplying the image photographing order with a certain multiple. Assume that the original photographing orders of the output images are 0, 1, 2, 3, . . . . In some embodiments of the present disclosure, the POCs of the output images may be a multiple of the original photographing orders, for example, may be 0, 2, 4, 6, . . . , or 0, 3, 6, 9, . . . , etc. The POCs of the output images may be a multiple of the original photographing order plus or minus a constant, for example, may be 1, 3, 5, 7, . . . , or −1, 2, 5, 8, . . . , and so on. Therefore, a difference between POCs of any two output images having neighboring display orders remains the same and is greater than 1, which ensures that the display orders of the output images remain unchanged, and the encoding orders of the output images are not changed in embodiments of the disclosure. Any two output images satisfy that the distance between the POCs increases proportionally to the distance between the display orders, which will not affect the operations such as the motion vector prediction and the scaling.

It should be understood that in some application scenarios, the original display orders of the output images may not be necessarily equidistant. For example, the original photographing orders of the output images may be 0, 1, 2, 3, 4, 5, 6, 7, 8, . . . , while image 3 and image 6 may be discarded for some reasons (such as due to freezing), and the photographing orders become 0, 1, 2, 4, 5, 7, 8, . . . . In some embodiments of the present disclosure, the POCs of the output images may be multiples of the original photographing orders, for example, 0, 2, 4, 8, 10, 14, 16, . . . . In some other application scenarios, the original display orders of the output images may have another representation form. In embodiments of the present disclosure, the POCs of the output images may also have another representation form, which is not limited to embodiments of the present disclosure.

In some embodiments of the present disclosure, typically, a difference between POCs of any two output images with neighboring display orders may be 2. For example, the POC sequence of the output images may be 0, 2, 4, 6, . . . or 1, 3, 5, 7, . . . .

Optionally, in some embodiments of the present disclosure, the POC of at least one (i.e., one or more) non-output image may be located between POCs of two output images with neighboring display orders. In other words, the POC of one or more non-output images may exist between POCs of two output images that are neighboring to each other in terms of POC. Therefore, the POC of the non-output image will not affect a distance between POCs of any two output images. The existence of the non-output image will not affect the distance referenced by the operations of the motion vector prediction and scaling of any two output images.

A non-output image may exist or may not exist between POCs of two output images that are neighboring to each other in terms of POC, but at least one non-output image exists in the entire bitstream, that is, a non-output image may exist between POCs of at least two output images. A number of POC(s) of the non-output image(s) between POCs of any two output images that are neighboring to each other in terms of POC may be the same or different.

In a specific example, in a POC sequence 1, 3, 5, 7, . . . of the output images, for example, an image with POC=4 may exist between an image with POC=3 and an image with POC=5. The image with POC=4 is a non-output image. A non-output image may or may not exist between the image with POC=5 and the image with POC=7.

In another specific example, in a POC sequence 0, 3, 6, 9 . . . of the output images, for example, an image with POC=4 and an image with POC=5 may exist between an image with POC=3 and an image with POC=6. An image of POC=7 may exist between the image with POC=6 and an image with POC=9. The image with POC=4, the image with POC=5, and the image with POC=7 are non-output images.

It should be understood that the POC sequences of the output images listed above and below in the specification are only exemplary and not limitations of embodiments of the present disclosure. For example, a minimum number of the POCs of the output images may not start from 0 or 1. The present disclosure does not limit the specific form of the POC.

Optionally, in some embodiments of the present disclosure, before the to-be-encoded image is encoded to generate the bitstream at S110, the encoding method 100 further includes dividing the to-be-encoded images into a plurality of GOPs. A GOP may include a single intra prediction image or a plurality of inter prediction images.

For example, in a lowdelay-B structure of embodiments of the present disclosure, the to-be-encoded image sequence may be I0, B2, B4, B6, B8, B10, B12, B14, B16, B17, B18, . . . B17 may be a non-output image, the other images may be output images. I image, that is, I0, may be allocated into a GOP, and every four output images thereafter may be a GOP, for example, B2, B4, B6, and B8 may be a GOP, and B10, B12, B14, and B16 may be a GOP.

Figure 2:
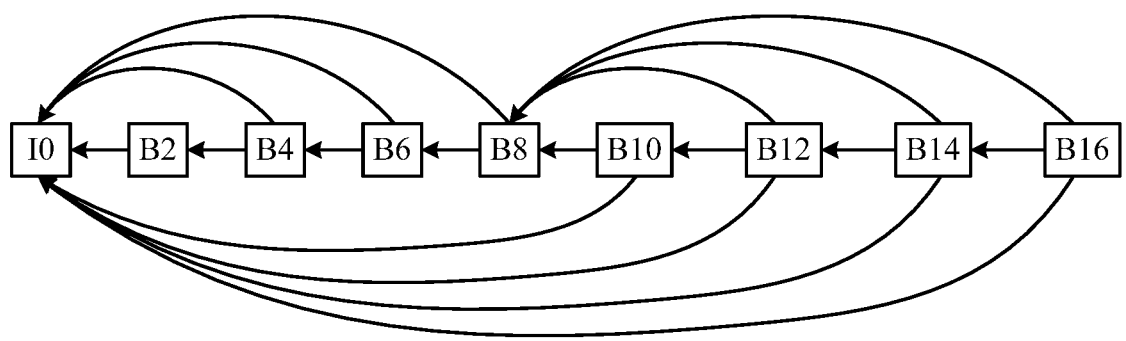
FIG. 2 is a schematic diagram showing a reference relationship among images of a group of pictures (GOP) according to an embodiment of the present disclosure.

FIG. 2 is a schematic diagram showing reference relationship (i.e., referenced short-term reference image) of images of a GOP according to an embodiment of the present disclosure. For each image in the GOP, a previous image of the current image and last images of previous successive GOPs as short-term reference images. A total number of the short-term reference images for each image may not exceed 4 images. For example, the short-term reference images used by B16 may include B14 (the previous image of the current image), and B8 and I0 (the last images of the previous successive GOPs). By analogy, short-term reference images used by B28 may include B26 (the previous image of the current image), and B24, B16, and B8 (the last images of the previous 3 successive GOPs and the total number of short-term reference images not exceeding 4).

As another example, in a hierarchical encoding structure used in embodiments of the present disclosure, the to-be-encoded image sequence may be I0, P16, B8, B4, B2, B6, B12, B10, B14, B17, P32, B24, B20, B18, B22, B28, B26, B30, . . . B17 may be a non-output image, and the others may be output images. I image, that is, I0, may be allocated to a GOP, and every eight output images thereafter may be a GOP, for example, P16, B8, B4, B2, B6, B12, B10, and B14 may be a GOP, and P32, B24, B20, B18, B22, B28, B26, B30 may be a GOP.

Optionally, in some embodiments of the present disclosure, the to-be-encoded images may include a first non-output image. In other words, at least one non-output image of the to-be-encoded images may include the first non-output image. The encoding order of the first non-output image may be after a first GOP and before a second GOP. It should be understood that the first GOP and the second GOP may be two GOPs of the output images that are successive in encoding order. As such, it is beneficial not to disturb the reference relationship of the images in each GOP, which improves encoding efficiency. For example, in the former example above, the non-output image B17 may be encoded after the GOP including B10, B12, B14, and B16 and before the GOP including B18, . . . . As another example, in the latter example above, the non-output image B17 may be encoded after the GOP including P16, B8, B4, B2, B6, B12, B10, and B14 and before the GOP including P32, B24, B20, B18, B22, B28, B26, and B30. Of course, the encoding order of the first non-output image may not need to consider the division of GOPs. The first non-output image may be encoded between two suitable output images, or may be encoded between any two output images, which is not limited by embodiments of the present disclosure.

It should be understood that since the POCs of the output images of embodiments of the present disclosure are changed as compared to the existing numbering method, the configuration parameters of the reference image set used when the image is encoded, such as the RPS configuration parameters, are also adjusted accordingly. In some embodiments of the present disclosure, the RPS configuration parameters are changed to the content of Table 2 as compared to Table 1.

TABLE 2

RPS configuration parameters of the short-term reference image in lowdelay B encoding of embodiments of the present disclosure

| index | type | POC | ref_pics_active | ref_pics | reference_pictures | predict | deltaRPS | ref_idcs | reference idcs |
|---|---|---|---|---|---|---|---|---|---|
| 1 | B | 2 | 4 | 4 | −2 −10 −18 −26 | 0 | | | |
| 2 | B | 4 | 4 | 4 | −2 −4 −12 −20 | 1 | −2 | 5 | 1 1 1 0 1 |
| 3 | B | 6 | 4 | 4 | −2 −6 −14 −22 | 1 | −2 | 5 | 0 1 1 1 1 |
| 4 | B | 8 | 4 | 4 | −2 −8 −16 −24 | 1 | −2 | 5 | 0 1 1 1 1 |

Optionally, in some embodiments of the present disclosure, an encoding method similar to that for an output image may be used for encoding a non-output image. For example, an inter prediction encoding method may be used for encoding the non-output image. A short-term reference image used for encoding the non-output image may be an encoded image.

Optionally, in an embodiment, at S110, encoding the to-be-encoded images to generate the bitstream may include encoding the first non-output image by referring to the short-term reference image same as the short-term reference image used by the last image in the first GOP. That is, the short-term reference image referenced by the first non-output image is the same as the short-term reference image of the last image of the first GOP that has an encoding order neighboring to the first non-output image and before the first non-output image.

It should be understood that the last image of the first GOP may be a last image of the first GOP in the encoding order. Of course, the last image in the first GOP may also be the last image of the first GOP in the display order, which is not limited by embodiments of the present disclosure.

Optionally, in an embodiment, at S110, encoding the to-be-encoded images to generate the bitstream may include encoding the first non-output image by referring to the short-term reference image same as the short-term reference used by the first image of the second GOP. That is, the short-term reference image referenced by the first non-output image is the same as the short-term reference image of the first image in the second GOP that has the encoding order neighboring to the first non-output image and after the first non-output image.

It should be understood that the first image in the second GOP may be the first image of the second GOP in the encoding order. Of course, the first image in the second is GOP may also be the first image of the second GOP in the display order, which is not limited by embodiments of the present disclosure.

A specific example is described here, that is, the short-term reference image of the first image in the second GOP is used as a reference for the first non-output image. Referring to Table 2, the short-term reference images of the first image in the GOP are −2, −10, −18, −26. Since the POC of the non-output image is one less than the POC of the first image in the second GOP, the short-term reference images of the non-output image should be −1, −9, −17, −25.

The RPS information of the short-term reference image used for encoding the non-output image is described in detail below.

Optionally, in some embodiments of the present disclosure, the to-be-encoded images include a second non-output image. The bitstream may include information for indicating a first-type reference image set used to encode the second non-output image. The first-type reference image set includes the short-term reference image. That is, the information of the first-type reference image set includes the RPS information of the short-term reference image used for encoding the second non-output image. It should be understood that the RPS information of the short-term reference image may be transmitted via the sequence header and/or the slice header.

Optionally, in an embodiment, a plurality of RPS configuration parameters that can be used for the short-term reference image of the non-output image, for example, the RPS configuration parameters that can be shared by a plurality of non-output images, may be configured in the sequence header in advance. For a subsequent non-output image, for example, the second non-output image, the RPS configuration parameter may be used just as instructed. The sequence header of the bitstream may include a correspondence between the configuration parameters of at least one short-term reference image and the index. The information of the first-type reference image set may include the index corresponding to the configuration parameter of the short-term reference image used to indicate the second non-output image. The configuration parameter of the at least one short-term reference image may be the RPS configuration parameter of the short-term reference image that can be used for encoding the non-output image. The information of the first-type reference image set, that is, the index corresponding to the configuration parameter of the short-term reference image used by the second non-output image, may be located in the slice header of the second non-output image, or in the image header.

Optionally, in another embodiment, when the RPS configuration parameters are not shared by the plurality of non-output images, the RPS configuration parameters of the short-term reference image of a certain non-output image may be directly indicated instead of through the index. Correspondingly, the information of the first-type reference image set may include the configuration parameters for indicating the short-term reference image used by the second non-output image. The information of the first-type reference image set, that is, the configuration parameters of the short-term reference image used by the second non-output image, may be located in the slice header of the second non-output image, or in the image header.

Optionally, in some embodiments of the present disclosure, the configuration parameters of the short-term reference image used by the second non-output image may include an offset of the POC of the short-term reference image used by the second non-output image relative to the POC of the second non-output image. That is, similar to the encoding method of the configuration parameter of the short-term reference image used by the output image, the configuration parameter of the short-term reference image used by the non-output image may be encoded by using the prediction encoding method. A bit number required by encoding may be saved by using the prediction encoding.

A situation in which the non-output image uses the short-term reference image of the first image of the next GOP as the reference is described. "deltaRPS" of the current non-output image and the first image in the next GOP is 1. "ref_idcs" is 4, that is, the 4 "reference_pictures" of the first image in the next GOP are used as the short-term reference images. "reference_pictures" of the non-output images are −1, −9, −17, −25. "reference idcs" is 1 1 1 1.

The long-term reference image used for encoding the non-output image may be the same as the long-term reference image used by the last image in the previous GOP, or the long-term reference image used by the first image in the subsequent GOP. In some other embodiments, any long-term reference image in the reference image buffer may be used to encode the non-output image, or encoding the non-output image may not need to refer to the long-term reference image, which is not limited by embodiments of the present disclosure.

The RPS information of the long-term reference image used by the encoded image (including the output image and the non-output image) of embodiments of the present disclosure is described in detail below.

Optionally, in some embodiments of the present disclosure, the bitstream may include information for indicating a second-type reference image set used by the encoded images. The second-type reference image set may include the long-term reference images.

The RPS information of the long-term reference image may have a similar indication manner as the RPS information of the short-term reference image. Optionally, in an embodiment, the sequence header of the bitstream may include a correspondence relationship between the configuration parameters of at least one long-term reference images and an index. The information of the second-type reference image set may include the index corresponding to the configuration parameter of the long-term reference image used to indicate an image. Optionally, in another embodiment, the information of the second-type reference image set may include the configuration parameter of the long-term reference image used to indicate the image. The configuration parameter of the long-term reference image used by the image may also be referred to as the RPS configuration parameter of the long-term reference image used by the image. The RPS configuration parameter of the long-term reference image used by the image may include an offset of the POC of the long-term reference image used by the image relative to the POC of the image.

The indication manners of the RPS information of the long-term reference image and the RPS information of the short-term reference image may also be different. The RPS information of the long-term reference image may not be based on the prediction encoding method but may use a direct encoding method.

Optionally, in an embodiment, the information of the second-type reference image set may be located in the sequence header of the bitstream. The information of the second-type reference image set may include a POC of a third non-output image. The third non-output image may be used as a long-term reference image of an image block of the image in the sequence corresponding to the sequence header. The POC of the non-output image in the sequence header may be used as the long-term reference image of the image block of the image (including the output image and/or the non-output image) in the sequence corresponding to the sequence header. There may be one third non-output image or a plurality of third non-output images.

Optionally, in another embodiment, the information of the second-type reference image set is located in the sequence header of the bitstream. The non-output image corresponding to the POC in the sequence header may be used as the long-term reference image of the image blocks of the images (including output image and/or non-output image) in the sequence corresponding to the sequence header. The sequence header may include the POCs of one or more non-output images. Whether a specific image or image slice uses the non-output image corresponding to the POC in the sequence header as the long-term reference image can also be specifically indicated in the image header or slice header.

Optionally, in another embodiment, the information of the second-type reference image set may be located in the slice header of the first slice of the image of the bitstream. The information of the second-type reference image set may include the configuration parameter of the long-term reference image of the image block in the first slice. In some embodiments, the information of the second-type reference image set located in the slice header may be used to indicate the configuration of the long-term reference image of the image block in the corresponding slice.

Specifically, the configuration parameters of the long-term reference image of the image block in the first slice may include a number of the non-output images and the POCs of the non-output images. In a specific solution, in the configuration parameters of the long-term reference image, the non-output images corresponding to the POCs included in the slice header may all be used as the long-term reference images of the image blocks in the first slice. In another specific solution, the configuration parameters of the long-term reference image of the image block in the first slice may also include a first identifier used to indicate whether the output image is used as the long-term reference image of the first slice. In this specific solution, the non-output images corresponding to the POCs included in the slice header may not all be used as the long-term reference images of the image blocks in the first slice. Whether to be used as the long-term reference image of the first slice may depend on the indication of the first identifier.

Specifically, when the first identifier indicates that a fourth non-output image of the non-output images is not used as a long-term reference image of the image block in the first slice, the encoding apparatus may delete the fourth non-output image from the reference image buffer. In other words, the encoding apparatus may delete the fourth non-output image from the reference image buffer, and use the first identifier to indicate that the fourth non-output image is not used as the long-term reference image of the image block in the first slice. After the fourth non-output image is deleted from the reference image buffer, for a slice or an image that is encoded after the first slice, reference will no longer be made to the fourth non-output image.

It should be understood that the slice header of embodiments of the present disclosure may also be replaced with an image header. Correspondingly, one image header may correspond to an image.

Optionally, in yet another embodiment, the configuration of the long-term reference image may be indicated in both the sequence header and in the slice header. The configuration of the long-term reference image in the sequence header may be applicable to all images (or slices, or image blocks) in the sequence corresponding to the sequence header. The configuration of the long-term reference image in the slice header may be applicable to the image blocks in the slice corresponding to the current slice header.

Optionally, in some embodiments of the present disclosure, the at least one non-output image of the bitstream may include a fifth non-output image and a sixth non-output image. The sixth non-output image may be encoded after the fifth non-output image. At S110, encoding the to-be-encoded images to generate the bitstream may include performing encoding on the output images with the encoding orders located after the first non-output image and before the sixth non-output image by using the fifth non-output image as a long-term reference image. In other words, the images with the encoding orders between the fifth non-output image and the sixth non-output image may all use the fifth non-output image as the long-term reference image. As mentioned above, the long-term reference image referenced by the to-be-encoded image may be determined by another rule, which is not limited by embodiments of the present disclosure.

After one non-output image is encoded, and before a next non-output image is encoded, all output images may use the non-output image as a reference image. The non-output image may be identified as a long-term reference image and placed in the reference image buffer. To increase this feature, a certain modification may be made to the RPS information of the output image after the non-output image. Specifically, an RPS configuration parameter of a long-term reference image may be added. After the short-term reference image part of the RPS configuration parameter is encoded, as described above, the long-term reference image part of the RPS configuration parameter may be encoded. The long-term reference image part may specifically include a number of the long-term reference images, a POC of the non-output image used as the long-term reference image, the first identifier that identifies whether the non-output image is used as a reference by the current image, and so on.

Optionally, in some embodiments of the present disclosure, the encoding method 100 may further include constructing the non-output image according to image blocks of a plurality of images located before the non-output image in encoding order. For example, constructing the non-output image according to the image blocks of the plurality of images before the non-output image in the encoding order may include, based on an original image, updating image blocks of the original image according to the plurality of images, and when a number of updated image blocks is greater than or equal to a preset threshold, using the updated original image as the non-output image.

A non-output image may be constructed based on the original image. The original image may be an intra prediction image, that is, I frame. For example, the original image may be an image corresponding to a random access point. The construction method may be based on a block-by-block updating manner. When the non-output image is constructed, encoding may be performed on the non-output image. A manner to determine that the non-output image is constructed may include, when the non-output image has a number of updated image blocks no less than a preset threshold relative to the original image. For example, if no less than 25% of the image blocks have been updated, determining that the current non-output image has been constructed. In embodiments of the present disclosure, the non-output image may also be selected or constructed based on another manner, such as directly determining I frame as the non-output image, which is not limited by embodiments of the present disclosure.

Optionally, in some embodiments of the present disclosure, the encoded data of the non-output image may include a second identifier for indicating not to output the non-output image. For example, when the image is the non-output image, the parameter "output_flag_present_flag" of the PPS may be set to 1, which means that the slice header includes a value of "pic_output_flag." The parameter "pic_output_flag" of the slice header of the non-output image is set to 0, which indicates that the image in which the slice is located is the non-output image.

Different from the examples described in Table 1 and Table 2, an example of another encoding method is provided below. Table 3 shows an example of using the RPS configuration parameters of the short-term reference images of the existing POC configuration manner. Each GOP includes two output images in this encoding method.

TABLE 3

RPS configuration parameters of the short-term reference images of an encoding method

| index | type | POC | ref_pics_active | ref_pics | reference_pictures | predict | deltaRPS | ref_idcs | reference idcs |
|---|---|---|---|---|---|---|---|---|---|
| 1 | B | 1 | 2 | 2 | −1 −3 | 0 | | | |
| 2 | B | 2 | 2 | 2 | −1 −2 | 1 | −1 | 3 | 1 0 1 |

Figure 3:
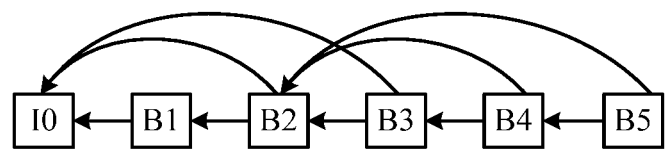
FIG. 3 is a schematic diagram showing a reference relationship among images of a GOP according to another embodiment of the present disclosure.

The short-term reference images of each image are the previous image and the last image of the previous successive GOP. The total number of the short-term reference images does not exceed 2. FIG. 3 is a schematic diagram showing a reference relationship of images of a GOP according to another embodiment of the present disclosure.

It should be understood that, since the POCs of the output images of embodiments of the present disclosure are changed as compared to the existing numbering method, the configuration parameters of the reference image set used when the image is encoded, such as the RPS configuration parameters, are also adjusted accordingly. In some embodiments of the present disclosure, the RPS configuration parameters may be changed to the content of Table 4 as compared to Table 3.

TABLE 4

RPS configuration parameters of the short-term reference images of an encoding method

| index | type | POC | ref_pics_active | ref_pics | reference_pictures | predict | deltaRPS | ref_idcs | reference idcs |
|---|---|---|---|---|---|---|---|---|---|
| 1 | B | 2 | 2 | 2 | −2 −6 | 0 | | | |
| 2 | B | 4 | 2 | 2 | −2 −4 | 1 | −2 | 3 | 1 0 1 |

After the first output image is encoded, the non-output image starts to be constructed. When the non-output image is constructed, the non-output image may be encoded after an end of a GOP and before an end of a next GOP.

Inter-frame encoding may be used to encode the RPS information of the non-output image. The situation of the non-output image using the short-term reference image of the first image of the next GOP as a reference is described. "deltaRPS" of the current non-output image and the first image of the next GOP is 1. "ref ides" is 2, that is, 2 "reference_pictures" of the first image of the next GOP are used as the short-term reference images. "reference_pictures" of the non-output image are −1, −5. "reference ides" is 1 1. The parameter "output_flag_present_flag" of the PPS of the non-output image is set to 1, which indicates that the value of "pic_output_flag" is included in the slice header. The parameter "pic_output_flag" of the slice header of the non-output image is set to 0, which indicates that the image in which the slice is located is a non-output image.

After one non-output image is encoded, and before a next non-output image is encoded, all output images may use the non-output image as a reference image. The non-output image may be identified as a long-term reference image and placed in the reference image buffer. To increase this feature, a certain modification may be made to the RPS information of the output image after the non-output image. Specifically, an RPS configuration parameter of a long-term reference image may be added. After the short-term reference image part of the RPS configuration parameter is encoded, as described above, the long-term reference image part of the RPS configuration parameter may be encoded. The long-term reference image part may specifically include a number of the long-term reference images, a POC of the non-output image used as the long-term reference image, the first identifier that identifies whether the non-output image is used as a reference by the current image, and so on.

An example of another encoding method is provided below. Table 5 shows an example of using the RPS configuration parameters of the short-term reference images of the existing POC configuration method. In this encoding method, one output image is included in each GOP.

TABLE 5

| RPS configuration parameters of the short-term reference images of another encoding method | | | | | | | | | |
|---|---|---|---|---|---|---|---|---|---|
| index | type | POC | ref_pics_active | ref_pics | reference_pictures | predict | deltaRPS | ref_idcs | reference idcs |
| 1 | B | 1 | 2 | 2 | −1 −2 | 0 | | | |

The short-term reference images of each image include the previous image and the last image of the previous successive GOP. The total number of the short-term reference images does not exceed 2. FIG. 4 is a schematic diagram showing a reference relationship of the images of a GOP according to another embodiment of the present disclosure.

It should be understood that since the POCs of the output image of embodiments of the present disclosure are changed as compared to the existing numbering method, the configuration parameters of the reference image set used when the image is encoded, such as the RPS configuration parameters, are also adjusted accordingly. In some embodiments of the present disclosure, the RPS configuration parameters may be changed to the content of Table 6 as compared to Table 5.

TABLE 5

| RPS configuration parameters of the short-term reference images of an encoding method | | | | | | | | | |
|---|---|---|---|---|---|---|---|---|---|
| index | type | POC | ref_pics_active | ref_pics | reference_pictures | predict | deltaRPS | ref_idcs | reference idcs |
| 1 | B | 2 | 2 | 2 | −2 −4 | 0 | | | |

After the first output image is encoded, the non-output image starts to be constructed. When the non-output image is constructed, the non-output image may be encoded after an end of a GOP and before an end of a next GOP.

Inter-frame encoding may be used to encode the RPS information of the non-output image. The situation of the non-output image using the short-term reference image of the first image of the next GOP as a reference is described. "deltaRPS" of the current non-output image and the first image of the next GOP is 1. "ref ides" is 2, that is, 2 "reference_pictures" of the first image of the next GOP are used as the short-term reference images. "reference_pictures" of the non-output image are −1, −3. reference "idc" is 1 1. The parameter "output_flag_present_flag" of the PPS of the non-output image is set to 1, which indicates that the value of "pic_output_flag" is included in the slice header. The parameter "pic_output_flag" of the slice header of the non-output image is set to 0, which indicates that the image in which the slice is located is a non-output image.

After one non-output image is encoded, and before a next non-output image is encoded, all output images may use the non-output image as a reference image. The non-output image may be identified as a long-term reference image and placed in the reference image buffer. To increase this feature, a certain modification may be made to the RPS information of the output image after the non-output image. Specifically, an RPS configuration parameter of a long-term reference image may be added. After the short-term reference image part part of the RPS configuration parameter is encoded, as described above, the long-term reference image part part of the RPS configuration parameter may be encoded. The long-term reference image part part may specifically include a number of the long-term reference images, a POC of the non-output image used as the long-term reference image, the first identifier that identifies whether the non-output image is used as a reference of the current image, and so on.

An example of another hierarchical encoding method is provided below. Table 7 shows an example of the RPS configuration parameters of the short-term reference image using the existing POC configuration method in the hierarchical encoding mode. 4 output frames are included in each GOP in this encoding method.

TABLE 7

RPS configuration parameters of the short-term reference images of an encoding method

| index | type | POC | ref_pics_active | ref_pics | reference_pictures | predict | deltaRPS | ref_idcs | reference idcs |
|---|---|---|---|---|---|---|---|---|---|
| 1 | B | 4 | 2 | 2 | −4 −8 | 0 | | | |
| 2 | B | 2 | 2 | 2 | −2 2 | 1 | 6 | 2 | 1 1 |
| 3 | B | 1 | 2 | 3 | −1 1 3 | 1 | 1 | 3 | 1 1 1 |
| 4 | B | 3 | 2 | 3 | −1 −3 1 | 1 | −2 | 3 | 1 1 1 |

FIG. 5 is a schematic diagram showing a reference relationship among images of a GOP according to another embodiment of the present disclosure. The encoding order is I0, B4, B2, B1, B3, B8, B6, B5, and B7.

It should be understood that since the POCs of the output image of embodiments of the present disclosure are changed as compared to the existing numbering method, the configuration parameters of the reference image set used when the image is encoded, such as the RPS configuration parameters, are also adjusted accordingly. In some embodiments of the present disclosure, the RPS configuration parameters may be changed to the content of Table 8 as compared to Table 7.

TABLE 8

RPS configuration parameters of the short-term reference images of an encoding method

| index | type | POC | ref_pics_active | ref_pics | reference_pictures | predict | deltaRPS | ref_idcs | reference idcs |
|---|---|---|---|---|---|---|---|---|---|
| 1 | B | 8 | 2 | 2 | −8 −16 | 0 | | | |
| 2 | B | 4 | 2 | 2 | −4 4 | 1 | 12 | 2 | 1 1 |
| 3 | B | 2 | 2 | 3 | −2 2 6 | 1 | 2 | 3 | 1 1 1 |
| 4 | B | 6 | 2 | 3 | −2 −6 2 | 1 | −4 | 3 | 1 1 1 |

After the first output image is encoded, the non-output image starts to be constructed. When the non-output image is constructed, the non-output image may be encoded after an end of a GOP and before an end of a next GOP.

Inter-frame encoding may be used to encode the RPS information of the non-output image. The situation of the non-output image using the short-term reference image of the first image of the next GOP as a reference is described. "deltaRPS" of the current non-output image and the first image of the next GOP is 1. "ref ides" is 2, that is, 2 "reference_pictures" of the first image of the next GOP are used as the short-term reference images. "reference_pictures" of the non-output image are −7, −15. "reference idc" is 1 1. The parameter "output_flag_present_flag" of the PPS of the non-output image is set to 1, which indicates that the value of "pic_output_flag" is included in the slice header. The parameter "pic_output_flag" of the slice header of the non-output image is set to 0, which indicates that the image in which the slice is located is a non-output image.

After one non-output image is encoded, and before a next non-output image is encoded, all output images may use the non-output image as a reference image. The non-output image may be identified as a long-term reference image and placed in the reference image buffer. To increase this feature, a certain modification may be made to the RPS information of the output image after the non-output image. Specifically, an RPS configuration parameter of a long-term reference image may be added. After the short-term reference image part part of the RPS configuration parameters is encoded, as described above, the long-term reference image part of the RPS configuration parameters may be encoded. The long-term reference image part may specifically include a number of the long-term reference images, a POC of the non-output image used as the long-term reference image, the first identifier that identifies whether the non-output image is used as a reference of the current image, and so on.

FIG. 6 is a schematic flowchart of a decoding method 200 according to an embodiment of the present disclosure. As shown in FIG. 6, the decoding method 200 includes the following processes.

At S210, the bitstream is received. The bitstream includes to-be-decoded data of the non-output images and the output images. A difference between POCs of any two output images having neighboring display orders is greater than 1. A ratio of a difference between the POCs of any two output images to a photographing time interval of the any two output images is same. A POC of at least one non-output image is between the POCs of the two output images having neighboring display orders.

At S220, the bitstream is decoded.

In the decoding method of embodiments of the present disclosure, the non-output images may be included in the bitstream. A difference of POCs of any two output images having neighboring display orders may be greater than 1, a ratio of a difference between POCs of any two output images to a photographing time interval of the any two output images may be same. Moreover, a POC of a non-output image may exist between POCs of two output images having neighboring display orders. As such, the non-output image may be inserted among the output images without affecting the time correlation of the POCs of the output images, which may avoid the problems such as motion vector prediction errors and scaling failures during encoding.

In embodiments of the present disclosure, the ratio of the difference between the POCs of the any two output images to the photographing time interval of the any two output images is proportional. In other words, a ratio of a difference between POCs of any two output images to a photographing time interval of the any two output images is equal to a ratio of a difference between POCs of any other two output images to a photographing time interval of the any other two output images.

Optionally, in some embodiments of the present disclosure, the difference between the POCs of the any two output images having neighboring display orders is 2.

Optionally, in some embodiments of the present disclosure, the to-be-encoded images may include a second non-output image. The bitstream may include the information for indicating a first-type reference image set used to encode the second non-output image. The first-type reference image set may include the short-term reference image.

Optionally, in some embodiments of the present disclosure, the sequence header of the bitstream may include the correspondence relationship between the configuration parameters of at least one short-term reference image and the index. The information of the first-type reference image set may include the index corresponding to the configuration parameter of the short-term reference image used to indicate the second non-output image.

Optionally, in some embodiments of the present disclosure, the information of the first-type reference image set may include the configuration parameters for indicating the short-term reference image used by the second non-output image.

Optionally, in some embodiments of the present disclosure, the information of the first-type reference image set may be located in the slice header of the second non-output image.

Optionally, in some embodiments of the present disclosure, the configuration parameters of the short-term reference image used by the second non-output image may include an offset of the POC of the short-term reference image used by the second non-output image relative to the POC of the second non-output image.

Optionally, in some embodiments of the present disclosure, the bitstream may include the information of the second-type reference image set used to indicate the encoded images. The second-type reference image set may include the long-term reference images.

Optionally, in some embodiments of the present disclosure, the information of the second-type reference image set may be located in the sequence header of the bitstream. The information of the second-type reference image set may include the POC of the third non-output image. The third non-output image may be used as the long-term reference image of the image block of the image in the sequence corresponding to the sequence header.

Optionally, in some embodiments of the present disclosure, the information of the second-type reference image set may be located in the slice header of the first slice of the image of the bitstream. The information of the second-type reference image set may include the configuration parameter of the long-term reference image of the image block in the first slice.

Optionally, in some embodiments of the present disclosure, the configuration parameters of the long-term reference image of the image block in the first slice may include a number of the non-output images and the POCs of the non-output images.

Optionally, in some embodiments of the present disclosure, the configuration parameters of the long-term reference image of the image block in the first slice may further include the first identifier used to indicate whether the non-output image is used as the long-term reference image of the first slice.

Optionally, in some embodiments of the present disclosure, at S220, decoding the bitstream may include when the first identifier indicates that the fourth non-output image of the non-output images is not used as the long-term reference image of the image block in the first slice, deleting the fourth non-output image from the reference image buffer.

Optionally, in some embodiments of the present disclosure, at least one non-output image of the bitstream may include the fifth non-output image and the sixth non-output image. The sixth non-output image may be decoded after the fifth non-output image. At S220, decoding the bitstream may include performing decoding on the output images with the to-be-decoded orders after the first non-output image and before the sixth non-output image by using the fifth non-output image as the long-term reference image.

Optionally, in some embodiments of the present disclosure, the encoded data of the non-output image may include the second identifier for indicating not to output the non-output image.

Optionally, in some embodiments of the present disclosure, the non-output image may include at least one of a long-term reference image, a constructed frame, a short-term reference image, or a constructed long-term reference image.

With reference to FIGS. 1 to 6, the methods of embodiments of the present disclosure are described in detail above. Encoding apparatuses and decoding apparatuses of embodiments of the present disclosure are described in detail below with reference to FIGS. 7 to 10.

Figure 7:
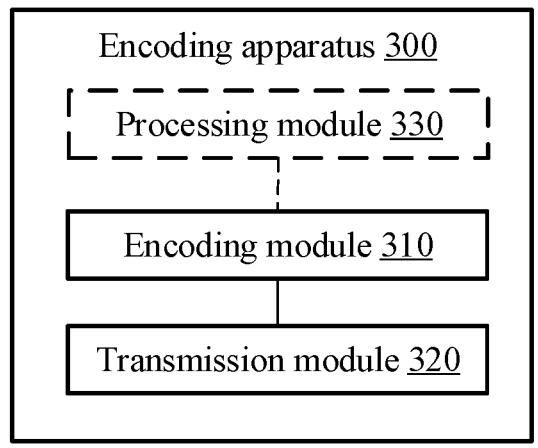
FIG. 7 is a schematic block diagram of an encoding apparatus according to an embodiment of the present disclosure.

FIG. 7 is a schematic block diagram of an encoding apparatus 300 according to an embodiment of the present disclosure. The encoding apparatus 300 includes an encoding module 310, which is configured to encode to-be-encoded images to generate a bitstream. The to-be-encoded images may include non-output images and output images. A difference between POCs of any two output images having neighboring display orders is greater than 1. A ratio of a difference between POCs of any two output images to a photographing time interval of the any two output images is same. A POC of at least one output image is between the POCs of two output images having neighboring display orders. The encoding apparatus 300 further include a transmission module 320, which is configured to transmit the bitstream generated by the encoding module 310.

The encoding apparatus of embodiments of the present disclosure may be configured to encode the non-output image into the bitstream. A difference of POCs of any two output images having neighboring display orders may be greater than 1. The POC of the non-output image may be between the POCs of the two output images having neighboring display orders. As such, the non-output image may be inserted among the output images without affecting the time correlation of the POCs of the output images, which may avoid motion vector prediction errors and scaling failures during encoding.

Optionally, in some embodiments of the present disclosure, at least for some pairs of two output images having neighboring display orders, differences between POCs thereof are same.

Optionally, in some embodiments of the present disclosure, a difference between POCs of any two output images having neighboring display orders is 2.

Optionally, in some embodiments of the present disclosure, the encoding apparatus 300 further includes a processing module 330, which is configured to divide the to-be-encoded image into a plurality of GOPs before the encoding module 310 encodes the to-be-encoded image to generate the bitstream. A GOP may include a single intra prediction image or a plurality of inter prediction images.

Optionally, in some embodiments of the present disclosure, the to-be-encoded images may include a first non-output image. The encoding order of the first non-output image may be after a first GOP and before a second GOP.

Optionally, in some embodiments of the present disclosure, the encoding module 310 may be specifically configured to encode the first non-output image by referring to the short-term reference image same as the short-term reference image used by the last image of the first GOP.

Optionally, in some embodiments of the present disclosure, the encoding module 310 may be specifically configured to encode the first non-output image with reference to the short-term reference image same as the short-term reference image used by a first image in the second GOP.

Optionally, in some embodiments of the present disclosure, the to-be-encoded images may include a second non-output image. The bitstream may include information for indicating a first-type reference image set used to encode the second non-output image. The first-type reference image set may include the short-term reference image.

Optionally, in some embodiments of the present disclosure, the sequence header of the bitstream may include a correspondence between the configuration parameters of at least one short-term reference image and the index. The information of the first-type reference image set may include the index corresponding to the configuration parameter of the short-term reference images used to indicate the second non-output image.

Optionally, in some embodiments of the present disclosure, the information of the first-type reference image set may include the configuration parameters for indicating the short-term reference image used by the second non-output image.

Optionally, in some embodiments of the present disclosure, the information of the first-type reference image set may be located in the slice header of the second non-output image.

Optionally, in some embodiments of the present disclosure, the configuration parameters of the short-term reference image used by the second non-output image may include an offset of the POC of the short-term reference image used by the second non-output image relative to the POC of the second non-output image.

Optionally, in some embodiments of the present disclosure, the bitstream may include the information used to indicate the second-type reference image set used by the encoded images. The second-type reference image set may include the long-term reference images.

Optionally, in some embodiments of the present disclosure, the information of the second-type reference image set may be located in the sequence header of the bitstream. The information of the second-type reference image set may include a POC of a third non-output image. The third non-output image may be used as a long-term reference image of the image block of the image in the sequence corresponding to the sequence header.

Optionally, in some embodiments of the present disclosure, the information of the second-type reference image set may be located in the slice header of the first slice of the image of the bitstream. The information of the second-type reference image set may include the configuration parameter of the long-term reference image of the image block in the first slice.

Optionally, in some embodiments of the present disclosure, the configuration parameters of the long-term reference image of the image block in the first slice may include a number of the non-output images and the POCs of the non-output images.

Optionally, in some embodiments of the present disclosure, the configuration parameters of the long-term reference image of the image block in the first slice may further include the first identifier used to indicate whether the non-output image is used as the long-term reference image of the first slice.

Optionally, in some embodiments of the present disclosure, the encoding module 310 may be specifically configured to when the first identifier indicates that the fourth non-output image of the non-output images is not used as the long-term reference image of the image block in the first slice, deleting the fourth non-output image from the reference image buffer.

Optionally, in some embodiments of the present disclosure, at least one non-output image of the bitstream may include the fifth non-output image and the sixth non-output image. The sixth non-output image may be encoded after the fifth non-output image. The encoding module 310 may be specifically configured to encode the output images with the encoding orders located after the first non-output image and before the sixth non-output image by using the fifth non-output image as the long-term reference image.

Optionally, in some embodiments of the present disclosure, the encoding apparatus may further include the processing module 330, which may also be configured to construct the non-output image according to the image blocks of the plurality of images with the encoding order before the non-output image.

Optionally, in some embodiments of the present disclosure, the processing module 330 constructing the non-output image according to the image blocks of the plurality of images before the non-output image in the coding order may include, based on the original image, updating the image blocks of the original image according to the plurality of images, and when the number of the updated image blocks is greater than or equal to a preset threshold, using the updated original image as a non-output image.

Optionally, in some embodiments of the present disclosure, the original image may be an intra prediction image.

Optionally, in some embodiments of the present disclosure, the encoded data of the non-output image may include a second identifier for indicating not to output the non-output image.

Optionally, in some embodiments of the present disclosure, the non-output image may include at least one of a long-term reference image, a constructed frame, a short-term reference image, or a constructed long-term reference image.

Figure 8:
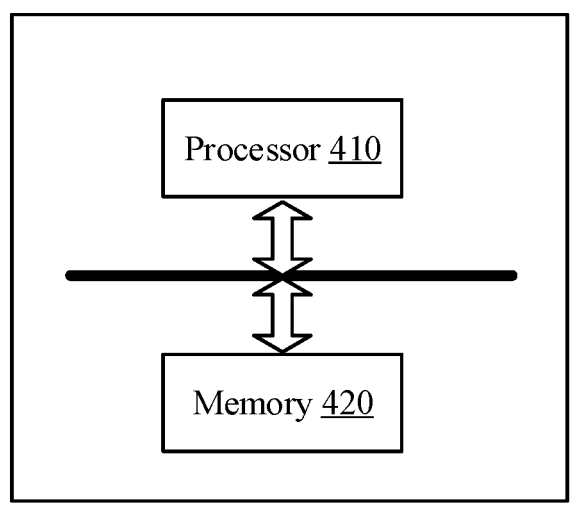
FIG. 8 is a schematic block diagram of an encoding apparatus according to another embodiment of the present disclosure.

FIG. 8 is a schematic block diagram of an encoding apparatus 400 according to another embodiment of the present disclosure. As shown in FIG. 8, the encoding apparatus 400 includes a processor 410 and a memory 420. The memory 420 stores computer instructions that, when the processor 410 executes the computer instructions, cause the encoding apparatus 400 to perform the following processes. To-be-encoded images are encoded to generate a bitstream. The to-be-encoded images may include non-output images and output images. A difference between POCs of any two output images having neighboring display orders is greater than 1. A ratio of a difference between POCs of any two output images to a photographing time interval of the any two output images is same. A POC of at least one output image may be between POCs of two output images having neighboring display orders. The bitstream is transmitted.

It should be understood that the encoding apparatus 400 of embodiments of the present disclosure further includes a network interface for transmitting the bitstream.

Optionally, in some embodiments of the present disclosure, at least for some pairs of two output images having neighboring display orders, differences between POCs thereof are same.

Optionally, in some embodiments of the present disclosure, a difference between POCs of any two output images having neighboring display orders is 2.

Optionally, in some embodiments of the present disclosure, the processor 410 may be further configured to execute the computer instructions to cause the encoding apparatus 400 to further execute the following processes before encoding the image to generate the bitstream. The to-be-encoded image may be divided into a plurality of GOPs. A GOP may include a single intra prediction image or a plurality of inter prediction images.

Optionally, in some embodiments of the present disclosure, the to-be-encoded images may include a first non-output image. The encoding order of the first non-output image may be after a first GOP and before a second GOP.

Optionally, in some embodiments of the present disclosure, the processor 410 executes the computer instructions for encoding the to-be-encoded image to generate the bitstream to cause the encoding apparatus to specifically executes the following processes. The first non-output image may be encoded by referring to the short-term reference image same as the short-term reference image used by the last image of the first GOP.

Optionally, in some embodiments of the present disclosure, the processor 410 executes the computer instructions for encoding the to-be-encoded image to generate the bitstream to cause the encoding apparatus to specifically executes the following processes. The first non-output image may be encoded by referring to the short-term reference image same as the short-term reference image used by the first image of the second GOP.

Optionally, in some embodiments of the present disclosure, the to-be-encoded images may include a second non-output image. The bitstream may include information for indicating a first-type reference image set used to encode the second non-output image. The first-type reference image set may include the short-term reference images.

Optionally, in some embodiments of the present disclosure, the sequence header of the bitstream may include a correspondence between the configuration parameters of at least one short-term reference image and the index. The information of the first-type reference image set may include the index corresponding to the configuration parameters of the short-term reference images used to indicate the second non-output image.

Optionally, in some embodiments of the present disclosure, the information of the first-type reference image set may include the configuration parameters for indicating the short-term reference image used by the second non-output image.

Optionally, in some embodiments of the present disclosure, the information of the first-type reference image set may be located in the slice header of the second non-output image.

Optionally, in some embodiments of the present disclosure, the configuration parameters of the short-term reference image used by the second non-output image may include an offset of the POC of the short-term reference image used by the second non-output image relative to the POC of the second non-output image.

Optionally, in some embodiments of the present disclosure, the bitstream may include information for indicating a second-type reference image set used by the encoded images. The second-type reference image set may include the long-term reference images.

Optionally, in some embodiments of the present disclosure, the information of the second-type reference image set may be located in the sequence header of the bitstream. The information of the second-type reference image set may include the POC of the third non-output image. The third non-output image may be used as the long-term reference image of the image block of the image in the sequence corresponding to the sequence header.

Optionally, in some embodiments of the present disclosure, the information of the second-type reference image set may be located in the slice header of the first slice of the image of the bitstream. The information of the second-type reference image set may include the configuration parameters of the long-term reference image of the image block in the first slice.

Optionally, in some embodiments of the present disclosure, the configuration parameters of the long-term reference image of the image block in the first slice may include a number of non-output images and POCs of the non-output images.

Optionally, in some embodiments of the present disclosure, the configuration parameters of the long-term reference image of the image block in the first slice may further include the first identifier used to indicate whether the non-output image is used as the long-term reference image of the first slice.

Optionally, in some embodiments of the present disclosure, the processor 410 executes the computer instructions for encoding the to-be-encoded image to generate the bitstream to cause the encoding apparatus to specifically executes the following processes. When the first identifier indicates that the fourth non-output image of the non-output images is not used as a long-term reference image of the image block in the first slice, the fourth non-output image may be deleted from the reference image buffer.

Optionally, in some embodiments of the present disclosure, at least one non-output image of the bitstream may include a fifth non-output image and a sixth non-output image. The sixth non-output image may be encoded after the fifth non-output image. The processor 410 executes the computer instructions for encoding the to-be-encoded images to generate the bitstream to cause the encoding apparatus to specifically executes the following processes. The output images with the encoding order after the first non-output image and before the sixth non-output image may be encoded by using the fifth non-output image as a long-term reference image.

Optionally, in some embodiments of the present disclosure, the processor 410 executes the computer instructions for encoding the to-be-encoded image to generate the bitstream to cause the encoding apparatus to specifically executes the following processes. The non-output image may be constructed according to the image blocks of the plurality of images with the encoding order before the non-output image.

Optionally, in some embodiments of the present disclosure, the processor 410 executes the computer instructions for encoding the to-be-encoded image to generate the bitstream to cause the encoding apparatus to specifically executes the following processes. Based on the original image, the image blocks of the original image may be updated according to the plurality of images. When the number of the updated image blocks is greater than or equal to a preset threshold, the updated original image may be used as a non-output image.

Optionally, in some embodiments of the present disclosure, the original image may be an intra prediction image.

Optionally, in some embodiments of the present disclosure, the encoded data of the non-output image may include a second identifier for indicating not to output the non-output image.

Optionally, in some embodiments of the present disclosure, the non-output image may include at least one of a long-term reference image, a constructed frame, a short-term reference image, or a constructed long-term reference image.

It should be understood that the encoding apparatus 300 shown in FIG. 8 or the encoding apparatus 400 shown in FIG. 8 may be configured to perform the operations or procedures of the encoding apparatus in above method embodiments. The operations and/or functions of the modules and the devices of the encoding apparatus 300 or the encoding apparatus 400 are used to implement the corresponding processes in above method embodiments and are not repeated here for brevity.

Figure 9:
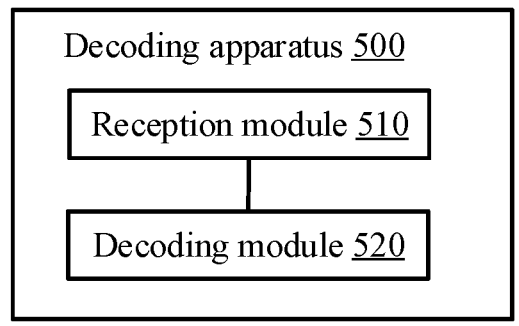
FIG. 9 is a schematic block diagram of a decoding apparatus according to an embodiment of the present disclosure.

FIG. 9 is a schematic block diagram of a decoding apparatus 500 according to an embodiment of the present disclosure. The decoding apparatus 500 includes a reception module 510, which is configured to receive a bitstream. The bitstream may include to-be-decoded data of non-output images and output images. A difference between POCs of any two output images having neighboring display orders is greater than 1. A ratio of the difference between the POCs of the any two output images having neighboring display orders to photographing time interval of the any two output images remains the same. A POC of at least one of the non-output images is between the POCs of the two output images neighboring in the display order. The decoding apparatus 500 further includes a decoding module 520, which is configured to decode the bitstream received by the reception module 510.

In the decoding apparatus of embodiments of the present disclosure, the non-output image may be saved in the bitstream. A difference of POCs of any two output images having neighboring display orders may be greater than 1, a ratio of a difference between POCs of any two output images to a photographing time interval of the any two output images may be same. Moreover, a POC of a non-output image may exist between POCs of two output images having neighboring display orders. As such, the non-output image may be inserted among the output images without affecting the time correlation of the POCs of the output images, which may avoid the problems such as motion vector prediction errors and scaling failures during encoding.

Optionally, in some embodiments of the present disclosure, at least for some pairs of two output images having neighboring display orders, differences between POCs thereof are same.

Optionally, in some embodiments of the present disclosure, the difference between the POCs of the any two output images having neighboring display orders is 2.

Optionally, in some embodiments of the present disclosure, the to-be-encoded images may include a second non-output image. The bitstream may include the information for indicating a first-type reference image set used to encode the second non-output image. The first-type reference image set may include the short-term reference image.

Optionally, in some embodiments of the present disclosure, the sequence header of the bitstream may include the correspondence relationship between the configuration parameters of at least one short-term reference image and the index. The information of the first-type reference image set may include the index corresponding to the configuration parameter of the short-term reference image used to indicate the second non-output image.

Optionally, in some embodiments of the present disclosure, the information of the first-type reference image set may include the configuration parameters for indicating the short-term reference image used by the second non-output image.

Optionally, in some embodiments of the present disclosure, the information of the first-type reference image set may be located in the slice header of the second non-output image.

Optionally, in some embodiments of the present disclosure, the configuration parameters of the short-term reference image used by the second non-output image may include an offset of the POC of the short-term reference image used by the second non-output image relative to the POC of the second non-output image.

Optionally, in some embodiments of the present disclosure, the bitstream may include the information of the second-type reference image set used to indicate the encoded images. The second-type reference image set may include the long-term reference images.

Optionally, in some embodiments of the present disclosure, the information of the second-type reference image set may be located in the sequence header of the bitstream. The information of the second-type reference image set may include the POC of the third non-output image. The third non-output image may be used as the long-term reference image of the image block of the image in the sequence corresponding to the sequence header.

Optionally, in some embodiments of the present disclosure, the information of the second-type reference image set may be located in the slice header of the first slice of the image of the bitstream. The information of the second-type reference image set may include the configuration parameter of the long-term reference image of the image block in the first slice.

Optionally, in some embodiments of the present disclosure, the configuration parameters of the long-term reference image of the image block in the first slice may include a number of the non-output images and the POCs of the non-output images.

Optionally, in some embodiments of the present disclosure, the configuration parameters of the long-term reference image of the image block in the first slice may further include the first identifier used to indicate whether the non-output image is used as the long-term reference image of the first slice.

Optionally, in some embodiments of the present disclosure, the decoding module 520 may be specifically configured to, when the first identifier indicates that the fourth non-output image of the non-output images is not used as a long-term reference image of the image block in the first slice, delete the fourth non-output image from the reference image buffer.

Optionally, in some embodiments of the present disclosure, at least one non-output image of the bitstream may include a fifth non-output image and a sixth non-output image. The sixth non-output image may be decoded after the fifth non-output image. The decoding module 520 may be specifically configured to decode the output images with the decoding order after the first non-output image and before the sixth non-output image by using the fifth non-output image as a long-term reference image.

Optionally, in some embodiments of the present disclosure, the encoded data of the non-output image may include a second identifier for indicating not to output the non-output image.

Optionally, in some embodiments of the present disclosure, the non-output image may include at least one of a long-term reference image, a constructed frame, a short-term reference image, or a constructed long-term reference image.

Figure 10:
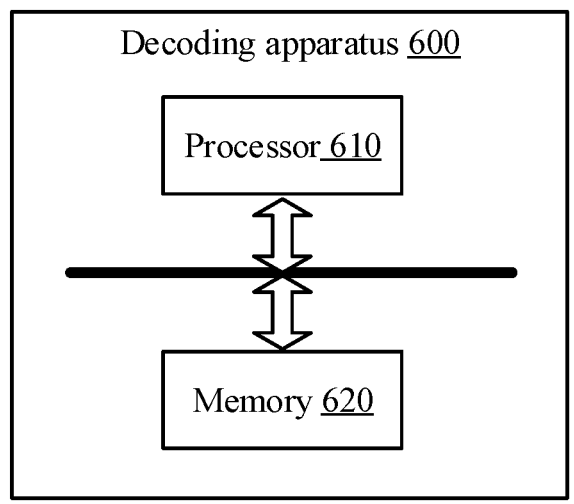
FIG. 10 is a schematic block diagram of a decoding apparatus according to another embodiment of the present disclosure.

FIG. 10 is a schematic block diagram of a decoding apparatus 600 according to another embodiment of the present disclosure. As shown in FIG. 10, the decoding apparatus 600 includes a processor 610 and a memory 620. The memory 620 stores computer instructions that, when the computer instructions are executed by the processor 610, causes the decoding apparatus 600 to execute the following processes. A bitstream is received. The bitstream may include to-be-decoded data of non-output images and output images. A difference between POCs of any two output images having neighboring display orders is greater than 1. A ratio of the difference between the POCs of the any two output images having neighboring display orders to photographing time interval of the any two output images remains the same. A POC of at least one of the non-output images is between the POCs of the two output images neighboring in the display order. The bitstream is decoded.

It should be understood that the decoding apparatus 600 of embodiments of the present disclosure further includes a network interface for transmitting the bitstream.

Optionally, in some embodiments of the present disclosure, at least for some pairs of two output images having neighboring display orders, differences between POCs thereof are same.

Optionally, in some embodiments of the present disclosure, the difference between the POCs of the any two output images having neighboring display orders is 2.

Optionally, in some embodiments of the present disclosure, the to-be-encoded images may include a second non-output image. The bitstream may include the information for indicating a first-type reference image set used to encode the second non-output image. The first-type reference image set may include the short-term reference image.

Optionally, in some embodiments of the present disclosure, the sequence header of the bitstream may include the correspondence relationship between the configuration parameters of at least one short-term reference image and the index. The information of the first-type reference image set may include the index corresponding to the configuration parameter of the short-term reference image used to indicate the second non-output image.

Optionally, in some embodiments of the present disclosure, the information of the first-type reference image set may include the configuration parameters for indicating the short-term reference image used by the second non-output image.

Optionally, in some embodiments of the present disclosure, the information of the first-type reference image set may be located in the slice header of the second non-output image.

Optionally, in some embodiments of the present disclosure, the configuration parameters of the short-term reference image used by the second non-output image may include an offset of the POC of the short-term reference image used by the second non-output image relative to the POC of the second non-output image.

Optionally, in some embodiments of the present disclosure, the bitstream may include the information of the second-type reference image set used to indicate the encoded images. The second-type reference image set may include the long-term reference images.

Optionally, in some embodiments of the present disclosure, the information of the second-type reference image set may be located in the sequence header of the bitstream. The information of the second-type reference image set may include the POC of the third non-output image. The third non-output image may be used as the long-term reference image of the image block of the image in the sequence corresponding to the sequence header.

Optionally, in some embodiments of the present disclosure, the information of the second-type reference image set may be located in the slice header of the first slice of the image of the bitstream. The information of the second-type reference image set may include the configuration parameter of the long-term reference image of the image block in the first slice.

Optionally, in some embodiments of the present disclosure, the configuration parameters of the long-term reference image of the image block in the first slice may include a number of the non-output images and the POCs of the non-output images.

Optionally, in some embodiments of the present disclosure, the configuration parameters of the long-term reference image of the image block in the first slice may further include the first identifier used to indicate whether the non-output image is used as the long-term reference image of the first slice.

Optionally, in some embodiments of the present disclosure, the processor 610 may be configured to execute the computer instructions for decoding the bitstream to cause the decoding apparatus 600 to execute the following processes. When the first identifier indicates that the fourth non-output image of the non-output images is not used as a long-term reference image of the image block in the first slice, the fourth non-output image may be deleted from the reference image buffer.

Optionally, in some embodiments of the present disclosure, at least one non-output image of the bitstream may include a fifth non-output image and a sixth non-output image. The sixth non-output image may be decoded after the fifth non-output image. the processor 610 may be configured to execute the computer instructions for decoding the bitstream to cause the decoding apparatus 600 to execute the following processes. The output images with the decoding order after the first non-output image and before the sixth non-output image may be decoded by using the fifth non-output image as a long-term reference image.

Optionally, in some embodiments of the present disclosure, the encoded data of the non-output image may include a second identifier for indicating not to output the non-output image.

Optionally, in some embodiments of the present disclosure, the non-output image may include at least one of a long-term reference image, a constructed frame, a short-term reference image, or a constructed long-term reference image.

It should be understood that the decoding apparatus 500 shown in FIG. 9 or the decoding apparatus 600 shown in FIG. 10 are configured to perform the operations or processes of the decoding apparatuses in method embodiments. The operations and/or functions of the modules and devices in the decoding apparatus 500 or the decoding apparatus 600 are used to implement the corresponding processes in method embodiments, for brevity, which are not repeated here.

It should be understood that the apparatuses of embodiments of the present disclosure may be implemented based on a memory and a processor. The memory stores instructions for executing the method of embodiments of the present disclosure that, when the processor executes the instructions, cause the apparatus to execute the method of embodiments of the present disclosure.

It should be understood that the processor mentioned in embodiments of the present disclosure may include a central processing unit (CPU), a network processor (NP), or a combination of the CPU and the NP. The processor may further include a hardware chip. The hardware chip may be an application-specific integrated circuit (ASIC), a programmable logic device (PLD), or a combination thereof. The above-mentioned PLD may be a complex programmable logic device (CPLD), a field-programmable gate array (FPGA), a generic array logic (GAL), or any combination thereof.

It should also be understood that the memory provided by embodiments of the present disclosure may include a volatile memory or a non-volatile memory, or may include both volatile and non-volatile memory. The non-volatile memory may include a read-only memory (ROM), a programmable read-only memory (PROM), an erasable programmable read-only memory (EPROM), an electrically erasable programmable read-only memory (EEPROM), a flash memory, a hard disk drive (HDD), or a solid-state drive (SSD). The volatile memory may include a random access memory (RAM), which may be used as an external cache. Through exemplary but not restrictive description, RAMs of many forms may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus RAM (DR RAM).

It should be noted that when the processor includes a general-purpose processor, DSP, an ASIC, an FPGA, or another programmable logic device, discrete gate or transistor logic device, or discrete hardware assembly, the memory (a storage module) is integrated into the processor.

It should be noted that the memory described in the specification may be intended to include, but are not limited to, these and any other suitable types of memories.

Embodiments of the present disclosure further provide a computer-readable storage medium, which stores instructions. When the instructions are executed on a computer, the computer may be caused to execute the processes performed by the encoding apparatus in the foregoing method embodiments.

Embodiments of the present disclosure further provide a computing device, which includes the computer-readable storage medium.

Embodiments of the present disclosure also provide a computer program product including instructions. When the computer runs the instructions of the computer program product, the computer may execute the processes performed by the encoding apparatus of method embodiments.

Embodiments of the present disclosure also provide the computer program product including the instructions. When the computer runs the instructions of the computer program product, the computer may execute the processes performed by the decoding apparatus of method embodiments.

Embodiments of the present disclosure also provide a computer chip. The computer chip may cause the computer to execute the processes performed by the encoding apparatus of method embodiments.

Embodiments of the present disclosure also provide a computer chip. The computer chip may cause the computer to execute the processes performed by the decoding apparatus of method embodiments.

Embodiments of the present disclosure may be applied to an aircraft, especially in the field of an unmanned aerial vehicle (UAV).

It should be understood that the division of circuits, sub-circuits, and sub-units of embodiments of the present disclosure is only illustrative. Those of ordinary skill in the art may be aware that the circuits, sub-circuits, and sub-units of the examples described in embodiments disclosed in the specification may be further divided or combined.

The device provided by embodiments of the present disclosure may be implemented in whole or in part by software, hardware, firmware, or any combination thereof. When implemented by software, the device may be implemented in the form of a computer program product in whole or in part. The computer program product may include one or more computer instructions. When the computer instructions are loaded and executed on a computer, the processes or functions described in embodiments of the present disclosure may be generated in whole or in part. The computer may include a general-purpose computer, a dedicated computer, a computer network, or another programmable device. The computer instructions may be stored in a computer-readable storage medium or transmitted from one computer-readable storage medium to another computer-readable storage medium. For example, the computer instructions may be transmitted from a website, computer, server, or data center to another website, computer, server, or data center via a wire (e.g., coaxial cable, optical fiber, digital subscriber line (DSL)) or wirelessly (e.g., infrared, wireless, microwave, etc.). The computer-readable storage medium may include any available medium that can be accessed by a computer or a data storage device such as a server or data center integrated by one or more available media. The available media may include a magnetic medium (e.g., a floppy disk, a hard disk, and a magnetic tape), an optical medium (e.g., a high-density digital video disc (DVD)), or a semiconductor medium (e.g., SSD).

It should be understood that various numberings of first, second, etc., involved in the specification are only for describing the distinction conveniently, and are not used to limit the scope of the present disclosure.

It should be understood that the term "and/or" in the specification is only to describe an association relationship of the associated objects, which represents three relationships. For example, A and/or B may represent three situations of A alone, A and B, and B alone. In addition, the character "/" in the specification generally indicates an "or" relationship of the associated objects before and after.

It should be understood that in embodiments of the present disclosure, the sizes of the order numbers of the above-mentioned processes do not mean an execution order. The execution order of the processes should be determined by their functions and internal logic, which should not limit the implementation process of embodiments of the present disclosure.

Those of ordinary skill in the art may be aware that the units and algorithm steps of the examples described in connection with embodiments disclosed in the specification can be implemented by electronic hardware or a combination of computer software and electronic hardware. Whether these functions are executed by hardware or software depends on the specific application and design constraint conditions of the technical solution. Those skilled in the art may use different methods for each specific application to implement the described functions, but such implementation should not be considered beyond the scope of the present disclosure.

Those skilled in the art can clearly understand that, for the convenience and simplicity of the description, for the specific operation process of the above-described system, device, and unit, reference may be made to the corresponding process in method embodiments, which is not be repeated here.

In some embodiments of the present disclosure, it should be understood that the disclosed system, device, and method may be implemented in another manner. For example, device embodiments described above are only illustrative. For example, the division of the units is only a logic functional division, and there may be another division in actual implementation. For example, a plurality of units or assemblies may be combined or integrated into another system, or some features may be ignored or not implemented. In addition, the displayed or discussed mutual coupling or direct coupling or communication connection may be indirectly coupled or communicatively connected through some interfaces, devices, or units, and may be electrical, mechanical, or in another form.

The units described as separate components may or may not be physically separated. The components displayed as units may or may not be physical units, that is, they may be located in one place, or distributed on a plurality of network units. Some or all of the units may be selected according to actual needs to achieve the purposes of the solutions of embodiments.

In addition, the functional units of embodiments of the present disclosure may be integrated into one processing unit, or each of the units may exist alone physically, or two or more units may be integrated into one unit.

The above are only specific embodiments of the present disclosure, but the scope of the present disclosure is not limited to this. Anyone skilled in the art can easily think of changes or substitutions within the technical scope disclosed in the present disclosure. The changes and substitutions should be covered within the scope of the present disclosure. Therefore, the scope of the present invention shall be subject to the scope of the claims.

What is claimed is:

1. An encoding method comprising:
   encoding to-be-encoded images including one or more non-output images and a plurality of output images, wherein:
   a difference between picture order counts (POCs) of two neighboring output images is greater than 1, the two neighboring output images being two of the plurality of output images that have neighboring display orders;

a ratio of a difference between POCs of two first output images of the plurality of output images to a photographing time interval of the two first output images is same as a ratio of a difference between POCs of two second output images of the plurality of output images to a photographing time interval of the two second output images, at least one of the two second output images being different from either of the two first output images; and a POC of at least one of the one or more non-output images is between the POCs of the two neighboring output images; and generating a bitstream having the to-be-encoded images.

2. The method of claim 1, wherein:

the two neighboring output images are two first neighboring output images; and the difference between the POCs of the two first neighboring output images is same as a difference between POCs of two second neighboring output images of the plurality of output images, at least one of the two second neighboring output images being different from either of the two first neighboring output images.

3. The method of claim 1, further comprising, before encoding the to-be-encoded images:

dividing the to-be-encoded images into a plurality of groups of pictures (GOP), each of the plurality of GOPs including a single intra prediction image or a plurality inter prediction images.

4. The method of claim 3, wherein an encoding order of one of the one or more non-output images is after a first GOP of the plurality of GOPs and before a second GOP of the plurality of GOPs.

5. The method of claim 4, wherein encoding the to-be-encoded images includes:

encoding the one of the one or more non-output images by referring to a short-term reference image used by a last image of the first GOP.

6. The method of claim 1, wherein:

the bitstream includes information used to indicate a reference image set used by an encoded image; and the reference image set includes a long-term reference image.

7. The method of claim 6, wherein:

the information is located in a sequence header of the bitstream; and the information includes a POC of one of the one or more non-output images that is used as a long-term reference image of an image block of an image in a sequence corresponding to the sequence header.

8. The method of claim 6, wherein:

the information is located in a slice header of a slice of an image of the bitstream; and the information includes a configuration parameter of a long-term reference image of an image bock in the slice.

9. The method of claim 8, wherein the configuration parameter includes:

a number of the one or more non-output images; and a POC of each of the one or more non-output images.

10. A decoding method comprising:

receiving a bitstream including to-be-decoded data of one or more non-output images and a plurality of output images, wherein:

a difference between picture order counts (POCs) of two neighboring output images is greater than 1, the two neighboring output images being two of the plurality of output images that have neighboring display orders;

a ratio of a difference between POCs of two first output images of the plurality of output images to a photographing time interval of the two first output images is same as a ratio of a difference between POCs of two second output images of the plurality of output images to a photographing time interval of the two second output images, at least one of the two second output images being different from either of the two first output images; and a POC of at least one of the one or more non-output images is between the POCs of the two neighboring output images; and decoding the bitstream.

11. The method of claim 10, wherein:

the two neighboring output images are two first neighboring output images; and the difference between the POCs of the two first neighboring output images is same as a difference between POCs of two second neighboring output images of the plurality of output images, at least one of the two second neighboring output images being different from either of the two first neighboring output images.

12. The method of claim 10, wherein:

the bitstream includes information used to indicate a reference image set used for encoding one of the one or more non-output images; and the reference image set includes a short-term reference image.

13. The method of claim 12, wherein:

a sequence header of the bitstream includes a correspondence relationship between a configuration parameter of the short-term reference image and an index; and the information includes the index corresponding to the configuration parameter used to indicate the short-term reference image used by the one of the one or more non-output images.

14. The method of claim 12, wherein the information includes:

a configuration parameter used to indicate the short-term reference image used by the one of the one or more non-output images.

15. The method of claim 14, wherein the information is located in a slice header of the one of the one or more non-output images.

16. The method of claim 10, wherein encoding data of the one or more non-output images include an identifier used to indicate not to output the one or more non-output images.

17. The method of claim 10, wherein the one or more non-output images include at least one of a long-term reference image, a constructed frame, a short-term reference image, or a constructed long-term reference image.

18. A decoding apparatus comprising:

a processor; and a memory storing computer instructions that, when executed by the processor, cause the processor to:

receive a bitstream including to-be-decoded data of one or more non-output images and a plurality of output images, wherein:

a difference between picture order counts (POCs) of two neighboring output images is greater than 1, the two neighboring output images being two of the plurality of output images that have neighboring display orders;

a ratio of a difference between POCs of two first output images of the plurality of output images to a photographing time interval of the two first output images is same as a ratio of a difference between POCs of two second output images of the plurality of output images to a photographing time interval of the two second output images, at least one of the two second output images being different from either of the two first output images; and a POC of at least one of the one or more non-output images is between the POCs of the two neighboring output images; and decode the bitstream.

* * * * *